United States Patent
Oyobe et al.

(10) Patent No.: US 7,855,901 B2
(45) Date of Patent: Dec. 21, 2010

(54) AC VOLTAGE OUTPUT APPARATUS AND HYBRID VEHICLE INCLUDING THE SAME

(75) Inventors: Hichirosai Oyobe, Toyota (JP); Makoto Nakamura, Okazaki (JP); Tetsuhiro Ishikawa, Nishikamo-gun (JP); Shigenori Togashi, Sagamihara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 476 days.

(21) Appl. No.: 11/992,547

(22) PCT Filed: Aug. 31, 2006

(86) PCT No.: PCT/JP2006/317714

§ 371 (c)(1),
(2), (4) Date: Mar. 25, 2008

(87) PCT Pub. No.: WO2007/037105

PCT Pub. Date: Apr. 5, 2007

(65) Prior Publication Data

US 2009/0159348 A1   Jun. 25, 2009

(30) Foreign Application Priority Data

Sep. 28, 2005   (JP)  ............................. 2005-281663

(51) Int. Cl.
   *H02M 1/12*   (2006.01)
(52) U.S. Cl. ..................... 363/41; 318/803; 318/811
(58) Field of Classification Search .................. 318/34, 318/85, 376, 378, 494, 696, 685, 803, 811, 318/798; 363/34–41, 56.02, 71; 180/65.8, 180/65.21
See application file for complete search history.

(56) References Cited

U.S. PATENT DOCUMENTS

| | | | |
|---|---|---|---|
| 4,757,434 A | | 7/1988 | Kawabata et al. |
| 5,099,186 A | | 3/1992 | Rippel et al. |
| 5,365,153 A | * | 11/1994 | Fujita et al. ..................... 318/34 |
| 5,680,302 A | | 10/1997 | Iwata et al. |
| 6,018,694 A | * | 1/2000 | Egami et al. ................. 701/102 |
| 6,320,775 B1 | | 11/2001 | Ito et al. |
| 6,355,987 B1 | * | 3/2002 | Bixel ........................... 290/52 |
| 6,486,632 B2 | * | 11/2002 | Okushima et al. ........... 318/599 |
| 6,630,804 B2 | * | 10/2003 | Moriya et al. .................. 318/85 |
| 7,486,036 B2 | * | 2/2009 | Oyobe et al. ................. 318/376 |

FOREIGN PATENT DOCUMENTS

| | | |
|---|---|---|
| EP | 0 376 728 A2 | 7/1990 |
| EP | 1 034 968 A1 | 9/2000 |
| JP | A 4-295202 | 10/1992 |
| WO | WO 2005/069471 A1 | 7/2005 |

\* cited by examiner

*Primary Examiner*—Rajnikant B Patel
(74) *Attorney, Agent, or Firm*—Oliff & Berridge, PLC

(57) ABSTRACT

An AC command voltage obtained by compensating a reference value of a commercial AC voltage output from a multiplication unit using an FB control unit is multiplied by k ($0 \leq k \leq 1$) by a multiplication unit and output to a first inverter control unit, and the remaining part is output to a second inverter control unit. The first and second inverter control units generate signals, based on command voltages obtained by superposing the AC command voltage from an AC output control unit on respective phase command voltages.

16 Claims, 9 Drawing Sheets

AC VOLTAGE OUTPUT APPARATUS AND HYBRID VEHICLE INCLUDING THE SAME

TECHNICAL FIELD

The present invention relates to an AC (Alternating Current) voltage output apparatus and a hybrid vehicle including the apparatus. More specifically, the present invention relates to an AC voltage generating apparatus capable of generating an AC voltage as a commercial power source and outputting the generated voltage to a load, as well as to a hybrid vehicle provided with the apparatus.

BACKGROUND ART

Conventionally, attempts have been made to use a hybrid vehicle as a power supply system, for more effective use of hybrid vehicles. As an example, a hybrid vehicle having a dedicated inverter for converting a DC (Direct Current) voltage generated in the hybrid vehicle to a commercial AC voltage has been known.

Meanwhile Japanese Patent Laying-Open No. 04-295202 discloses an electric motor drive and power processing apparatus capable of generating an AC voltage and supplying the voltage to an external apparatus without necessitating a dedicated inverter. The electric motor drive and power processing apparatus includes a secondary battery, inverters IA and IB, three-phase AC motors MA and MB, and a control unit. Three-phase AC motors MA and MB respectively include three-phase windings CA and CB in a Y-configuration, and to neutral points NA and NB of three-phase windings CA and CB, an input/output port is connected through an EMI filter.

Inverters IA and IB are provided corresponding to three-phase AC motors MA and MB, respectively, and connected to three-phase windings CA and CB, respectively. Inverters IA and IB are connected parallel to the secondary battery.

In the electric motor drive and power processing apparatus, inverters IA and IB generate sinusoidal, regulated AC power at neutral points NA, NB, and the generated AC power can be output to an external apparatus connected to the input/output port.

In the electric motor drive and power processing apparatus disclosed in Japanese Patent Laying-Open No. 04-295202, however, it is impossible to generate the AC voltage across neutral points NA and NB while the three-phase AC motors MA and MB are driven. Here, assuming that the inverters generate the AC voltage across the neutral points while driving the motors, it follows that the voltage input to the inverters is used divided for driving the motors and for generating the AC voltage. Therefore, there might be a situation that the inverter driving the motor cannot secure one of or both of the voltages for driving the motors and for generating the AC voltage. As for the generation of AC voltage, voltage burden can be shared by the two inverters, and therefore, voltage burden on the inverters should desirably be varied in accordance with motor load.

In Japanese Patent Laying-Open No. 04-295202 described above, a specific method of feedback control for generating a desired AC voltage across neutral points NA and NB is not disclosed. In a hybrid vehicle requiring high reliability, feedback control of particularly high stability is desirable. It is also desirable to select an appropriate method of feedback control in consideration of voltage margin in each inverter and computational burden of the processing apparatus.

Further, in switching control of an inverter, generally, there is a dead time provided for preventing simultaneous turn-on of upper and lower arms, and this dead time causes waveform distortion in the waveform of AC voltage generated across the neutral points. Particularly in a large power inverter such as used for a hybrid vehicle, the dead time is often set longer, resulting in more serious waveform distortion in the AC voltage generated across the neutral points. In Japanese Patent Laying-Open No. 04-295202 described above, the waveform distortion in the AC voltage caused by the influence of inverter dead time is not at all discussed.

DISCLOSURE OF THE INVENTION

The present invention was made to solve the above-described problems, and its object is to provide an AC voltage output apparatus in which voltage burden on two inverters for generating an AC voltage across neutral points is variable.

Another object of the present invention is to provide a highly stable AC voltage output apparatus.

A further object of the present invention is to provide an AC voltage output apparatus adopting an appropriate feedback control in consideration of voltage margin in each inverter and computational burden of the processing apparatus.

A still further object of the present invention is to provide an AC voltage output apparatus capable of suppressing distortion of AC voltage waveform caused by the influence of inverter dead time.

A further object of the present invention is to provide a hybrid vehicle including an AC voltage output apparatus in which voltage burden on two inverters for generating an AC voltage across neutral points is variable.

A further object of the present invention is to provide a hybrid vehicle including a highly stable AC voltage output apparatus.

A still further object of the present invention is to provide a hybrid vehicle including an AC voltage output apparatus adopting an appropriate feedback control.

A still further object of the present invention is to provide a hybrid vehicle including an AC voltage output apparatus capable of suppressing distortion of AC voltage waveform caused by the influence of inverter dead time.

According to an aspect, the present invention provides an AC voltage output apparatus, including: a first poly-phase AC electric motor including a star-connected first poly-phase winding as a stator winding; a second poly-phase AC electric motor including a star-connected second poly-phase winding as a stator winding; first and second inverters respectively connected to the first and second poly-phase windings, an inverter control unit controlling the first and second inverters; and an AC command voltage generating unit generating an AC command voltage for generating an AC voltage across a first neutral point of the first poly-phase winding and a second neutral point of the second poly-phase winding. The AC command voltage generating unit includes a distributing unit distributing the AC command voltage to first and second AC command voltages based on a voltage burden ratio indicating ratio of voltage burdens to be borne by the first and second inverters for generating the AC voltage. The inverter control unit controls the first inverter based on a command voltage obtained by superposing the first AC command voltage on a command voltage of each phase for the first poly-phase AC electric motor, and controls the second inverter based on a command voltage obtained by superposing the second AC command voltage on a command voltage of each phase for the second poly-phase AC electric motor.

In the AC voltage output apparatus of the present invention, the first and second inverters generate an AC voltage (for example, commercial AC voltage) across the first neutral point of the first poly-phase winding and the second neutral point of the second poly-phase winding. The AC command voltage for generating the AC voltage is distributed to the first and second inverters by the distributing unit based on a prescribed voltage burden ratio, and the first and second inverters share the voltage for generating the AC voltage in accordance with the voltage burden ratio.

Therefore, in the AC voltage output apparatus in accordance with the present invention, by varying the voltage burden ratio at the distributing unit, the voltage burden on the first and second inverters for generating the AC voltage across the first and second neutral points can be changed.

Preferably, the voltage burden ratio is set in accordance with driving load on the first and second poly-phase AC electric motors.

In the AC voltage output apparatus, the first and second inverters share the burden of the voltage for generating the AC voltage, at the voltage burden ratio reflecting the driving load of the first and second poly-phase AC electric motors. Therefore, in the AC voltage output apparatus, voltage burden concentration on the first or second inverter can be avoided.

Preferably, the AC voltage output apparatus further includes a voltage detecting unit detecting a voltage across the first and second neutral points. The AC command voltage generating unit further includes a feedback operating unit calculating an amount of compensation based on a deviation between a reference voltage indicating a target of the AC voltage and the voltage detected by the voltage detecting unit, and compensating for the reference voltage using the calculated amount of compensation to generate the AC command voltage.

In the AC voltage output apparatus, using the voltage across the first and second neutral points detected by the voltage detecting unit, the AC voltage generated across the first and second neutral points is feedback-controlled to the reference voltage. Therefore, the AC voltage output apparatus provides AC voltage with small distortion.

Further, the present invention provides an AC voltage output apparatus, including: a first poly-phase AC electric motor including a star-connected first poly-phase winding as a stator winding; a second poly-phase AC electric motor including a star-connected second poly-phase winding as a stator winding; first and second inverters respectively connected to the first and second poly-phase windings; first and second inverter control units controlling the first and second inverters respectively; an AC command voltage generating unit generating an AC command voltage for generating an AC voltage across a first neutral point of the first poly-phase winding and a second neutral point of the second poly-phase winding; and a voltage detecting unit detecting a voltage across the first and second neutral points. The AC command voltage generating unit includes a first feedback operating unit calculating a first amount of compensation based on a deviation between an average value of magnitude of voltages detected by the voltage detecting unit and a reference value indicating a target of the average value, and generating the AC command voltage based on the reference value compensated for by using the calculated first amount of compensation. The first inverter control unit controls the first inverter based on a command voltage of each phase for the first poly-phase AC electric motor. The second inverter control unit controls the second inverter based on a command voltage obtained by superposing the AC command voltage on a command voltage of each phase for the second poly-phase AC electric motor.

In the AC voltage output apparatus of the present invention, the first and second inverters generate an AC voltage (for example, commercial AC voltage) across the first neutral point of the first poly-phase winding and the second neutral point of the second poly-phase winding. Here, the first feedback operating unit feedback-controls an average value of magnitude of the AC voltages generated across the first and second neutral points, to a reference value indicating the target of the average value.

Therefore, in the AC voltage output apparatus of the present invention, as compared with the feedback control based on the instantaneous value of the AC voltage generated across the first and second neutral points, control response can be lowered and control stability can be improved.

Preferably, the AC command voltage generating unit further includes a second feedback operating unit calculating a second amount of compensation based on a deviation between a reference voltage indicating a target of the AC voltage and the voltage detected by the voltage detecting unit. The first inverter control unit controls the first inverter based on a command voltage obtained by superposing the second amount of compensation on the command voltage of each phase for the first poly-phase AC electric motor.

In the AC voltage output apparatus, large deviation is removed by the first feedback operating unit performing feedback control based on the average value of AC voltages generated across the first and second neutral points, and subtle deviation not effectively removed by the first feedback operating unit is removed by the second feedback operating unit performing feedback control based on the instantaneous value of the AC voltage. As a result of such function division, the first amount of compensation attained by the first feedback operating unit becomes larger than the second amount of compensation attained by the second feedback operating unit. Here, assuming that the AC voltage is generated across the first and second neutral points while the first poly-phase AC electric motor is driven (and the second poly-phase AC electric motor is off), the first amount of compensation is output to the second inverter control unit corresponding to the second inverter having larger voltage margin, and the second amount of compensation is output to the first inverter control unit corresponding to the first inverter having smaller voltage margin.

Therefore, in the AC voltage output apparatus, appropriate feedback control considering the load on the first and second poly-phase AC electric motors at the time of generating the AC voltage can be realized.

Preferably, the first inverter control unit and the second feedback operating unit are mounted on a first processing apparatus. The second inverter control unit and the first feedback operating unit are mounted on a second processing apparatus.

Therefore, in the AC voltage output apparatus, computational load can appropriately be shared by the first and second processing apparatuses.

Further, the present invention provides an AC voltage output apparatus, including: a first poly-phase AC electric motor including a star-connected first poly-phase winding as a stator winding; a second poly-phase AC electric motor including a star-connected second poly-phase winding as a stator winding; first and second inverters respectively connected to the first and second poly-phase windings; an inverter control unit controlling the first and second inverters; an AC command voltage generating unit generating an AC command voltage for generating an AC voltage across a first neutral point of the first poly-phase winding and a second neutral point of the second poly-phase winding; and a voltage detecting unit detecting a voltage across the first and second neutral points. The AC command voltage generating unit includes a repetitive control unit calculating, based on a deviation in an immediately preceding AC voltage cycle between a reference voltage indicating a target of the AC voltage and the voltage detected by the voltage detecting unit, a first amount of compensation successively for each phase of the AC voltage. The inverter control unit controls the first and second inverters based on a command voltage obtained by superposing the AC command voltage and the first amount of compensation on a command voltage of each phase for the first or second poly-phase AC electric motor.

In the AC voltage output apparatus in accordance with the present invention, the first and second inverters generate an AC voltage (for example, commercial AC voltage) across the first neutral point of the first poly-phase winding and the second neutral point of the second poly-phase winding. Here, though periodic disturbance is generated particularly near the zero-cross point of the AC voltage because of the influence of dead time of the first and second inverters, feedback control is repeatedly executed for every phase based on the deviation in an immediately preceding AC voltage cycle, in the AC voltage output apparatus.

Therefore, in the AC voltage output apparatus of the present invention, the distortion in AC voltage waveform caused by the influence of dead time of the first and second inverters can be suppressed.

Preferably, the AC voltage output apparatus further includes a current detecting unit detecting a current flowing to a load receiving supply of the AC voltage. The AC command voltage generating unit further includes a load current compensating unit calculating a second amount of compensation based on the current detected by the current detecting unit. The inverter control unit controls the first and second inverters based on a command voltage obtained by superposing the AC command voltage and the first and second amounts of compensation on the command voltage of each phase for the first or second poly-phase AC electric motor.

In the AC voltage output apparatus, the feedback control by the repetitive control unit has a wasted time of one period of the AC voltage. Therefore, only by the control by the repetitive control unit, it is impossible to suppress waveform distortion resulting from abrupt load variation. Therefore, in the AC voltage output apparatus, the load current compensating unit executes feedback control based on load current detected by the current detecting unit. Accordingly, in the AC voltage output apparatus, waveform distortion resulting from abrupt load variation can be suppressed.

Further, the present invention provides a hybrid vehicle, including: any of the AC voltage output apparatuses described above; an internal combustion engine having a crank shaft mechanically coupled to a rotation shaft of the first poly-phase AC electric motor, and capable of applying rotational force to the first poly-phase AC electric motor; and a driving wheel coupled to a rotation shaft of the second poly-phase AC electric motor, and receiving driving force from the second poly-phase AC electric motor.

The hybrid vehicle of the present invention includes any of the AC voltage output apparatuses described above. Therefore, the hybrid vehicle of the present invention as such can be used as a power source system. Further, it is unnecessary to provide a dedicated inverter to generate the AC voltage and, therefore, the present invention does not hinder size reduction, cost reduction and weight reduction (higher fuel efficiency) that are much required of the hybrid vehicle.

As described above, in the present invention, by varying the voltage burden ratio at the distributing unit, the voltage burden on the first and second inverters for generating the AC voltage across the first and second neutral points can be changed.

Further, as the first feedback operating unit performing feedback control on the average value of AC voltage magnitude to a reference value is provided, highly stable control for generating the AC voltage is realized.

Further, by combining the first feedback operating unit with the second inverter control unit and combining the second feedback operating unit with the first inverter control unit, appropriated feedback control considering load can be realized.

Further, the repetitive control unit effectively suppresses disturbance periodically generated by the influence of inverter dead time. Further, as the load current compensating unit is additionally provided, distortion of AC voltage caused by abrupt load variation can be suppressed.

BEST MODES FOR CARRYING OUT THE INVENTION

Figure 1:
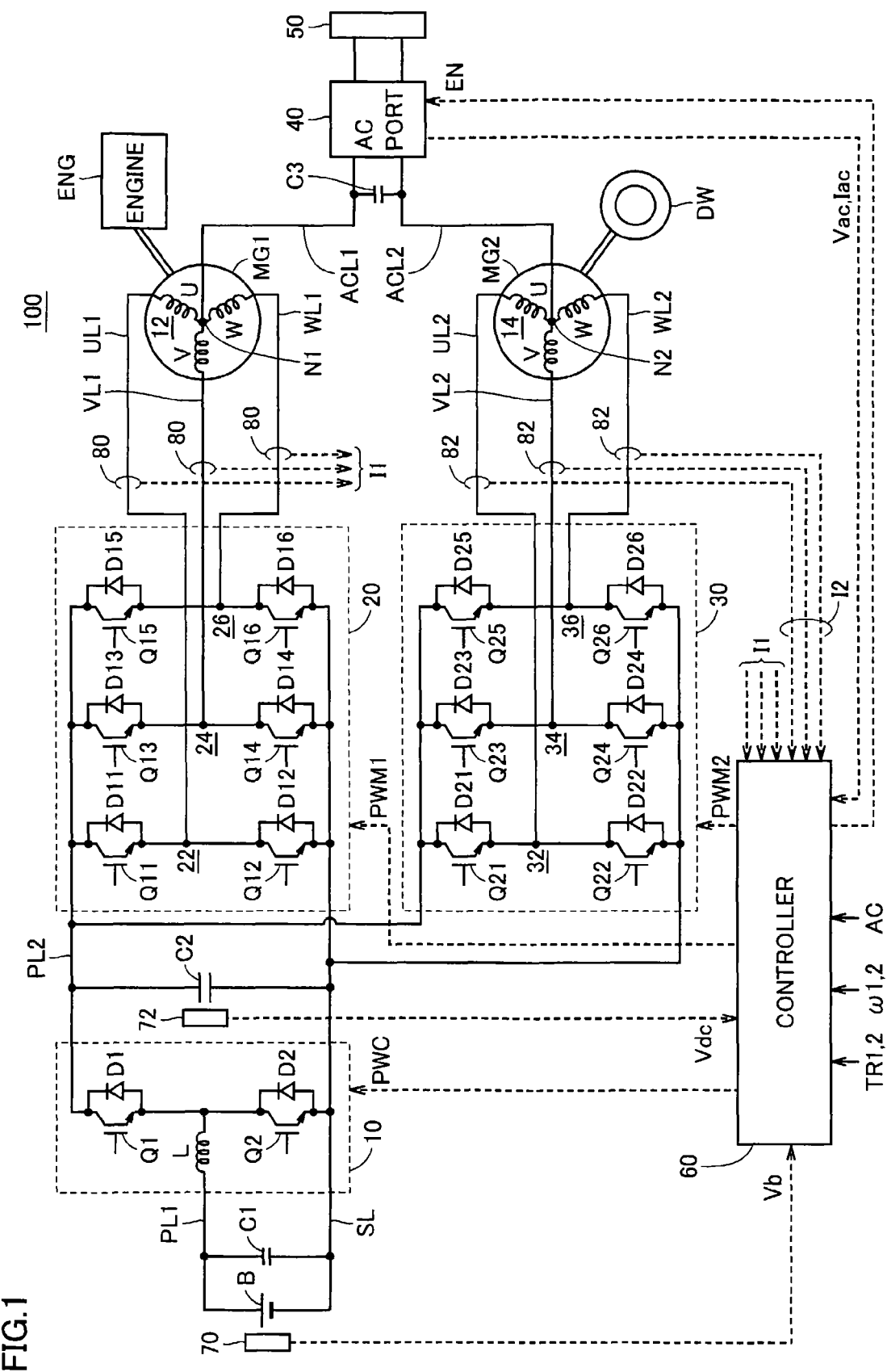
FIG. 1 is an overall block diagram of the AC voltage output apparatus in accordance with a first embodiment of the present invention.

In the following, embodiments of the present invention will be described in detail with reference to the figures. The same or corresponding portions are denoted by the same reference characters, and description thereof will not be repeated.

First Embodiment

FIG. 1 is an overall block diagram of an AC voltage output apparatus 100 in accordance with the first embodiment of the present invention. Referring to FIG. 1, AC voltage output apparatus 100 includes an electric storage B, a boost converter 10, inverters 20 and 30, motor generators MG1 and MG2, a controller 60, capacitors C1 and C2, power lines PL1 and PL2, a ground line SL, U-phase lines UL1 and UL2, V-phase lines VL1 and VL2, W-phase lines WL1 and WL2, voltage sensors 70 and 72, and current sensors 80 and 82. AC voltage output apparatus 100 further includes AC output lines ACL1 and ACL2, a capacitor C3, an AC port 40 and a connector 50.

AC voltage output apparatus 100 is mounted on a vehicle, such as a hybrid vehicle having an engine ENG and a motor generator MG2 as power sources. Motor generator MG1 is incorporated in the hybrid vehicle, coupled to engine ENG and operating as a motor that can start the operation of engine ENG and as a generator driven by the engine ENG. Motor generator MG2 is incorporated in the hybrid vehicle, coupled to a driving wheel DW as a motor driving the driving wheel DW.

Electric storage B has its positive electrode connected to power line PL1 and its negative electrode connected to ground line SL. Capacitor C1 is connected between power line PL1 and ground line SL.

Boost converter 10 includes a reactor L, npn transistors Q1 and Q2, and diodes D1 and D2. The npn transistors Q1 and Q2 are connected in series between power line PL2 and ground line SL. Between the collector and emitter of npn transistors Q1 and Q2, diodes D1 and D2 are connected, respectively, to cause a current flow from the emitter side to the collector side. Reactor L has one end connected to a node of npn transistors Q1 and Q2, and the other end connected to power line PL1.

As the above-described npn transistors and other npn transistors that will be described later in the specification, an IGBT (Insulated Gate Bipolar Transistor) may be used. Further, in place of the npn transistor, a power switching element such as a power MOSFET (Metal Oxide Semiconductor Field-Effect Transistor) may be used.

Capacitor C2 is connected between power line PL2 and ground line SL. Inverter 20 includes a U-phase arm 22, a V-phase arm 24 and a W-phase arm 26. U-phase arm 22, V-phase arm 24 and W-phase arm 26 are connected in parallel between power line PL2 and ground line SL. U-phase arm 22 consists of series-connected npn transistors Q11 and Q12, V-phase arm 24 consists of series-connected npn transistors Q13 and Q14, and W-phase arm 26 consists of series-connected npn transistors Q15 and Q16. Between the collector and emitter of npn transistors Q11 to Q16, diodes D1 to D16 are connected, respectively, to cause current flow from the emitter side to the collector side.

Motor generator MG1 includes a three-phase coil 12 as a stator coil. Respective phase coils forming the three-phase coil have one end connected together to form a neutral point N1, and have the other end connected to nodes between npn transistors of respective phase arms of inverter 20.

Inverter 30 includes a U-phase arm 32, a V-phase arm 34 and a W-phase arm 36. Motor generator MG2 includes a three-phase coil 14 as a stator coil. Inverter 30 and motor generator MG2 have the same structures as inverter 20 and motor generator MG1, respectively.

AC output line ACL1 has one end connected to neutral point N1 and the other end connected to AC port 40. AC output line ACL2 has one end connected to neutral point N2 and the other end connected to AC port 40. Capacitor C3 is connected between AC output lines ACL1 and ACL2. AC port 40 is arranged between AC output line ACL1, ACL2 and connector 50.

Electric storage B is a rechargeable DC power source, such as a nickel hydride or lithium ion secondary battery. Electric storage B outputs a DC power to boost converter 10. Further, electric storage B is charged by boost converter 10. It is noted that a large capacity capacitor or a fuel cell may be used as electric storage B.

Voltage sensor 70 detects voltage Vb of electric storage B, and outputs the detected voltage Vb to controller 60. Capacitor C1 smoothes voltage variation between power supply line PL1 and ground line SL.

In accordance with a signal PWC from controller 60, boost converter 10 boosts the DC voltage received from electric storage B using reactor L, and supplies the boosted voltage to power line PL2. Specifically, in accordance with the signal PWC from controller 60, boost converter 10 accumulates the current that flows in accordance with the switching operation of npn transistor Q2 as magnetic field energy in reactor L, thereby boosting the DC voltage from electric storage B. Then, boost converter 10 outputs the boosted voltage through diode D1 to power line PL2 in synchronization with the off-timing of npn transistor Q2. Further, boost converter 10 lowers the DC voltage supplied from power line PL2 to charge electric storage B, in accordance with the signal PWC from controller 60.

Capacitor C2 smoothes voltage variation between power supply line PL2 and ground line SL. Voltage sensor 72 detects voltage across terminals of capacitor C2, that is, voltage Vdc of power line PL2 with respect to ground line SL, and outputs the detected voltage Vdc to controller 60.

In accordance with a signal PWM1 from controller 60, inverter 20 converts the DC voltage received from power line PL2 to a three-phase AC voltage, and outputs the converted three-phase AC voltage to motor generator MG1. Further, inverter 20 converts three-phase AC voltage generated by motor generator MG1 receiving power from engine ENG to a DC voltage in accordance with the signal PWM1 from controller 60, and outputs the converted DC voltage to power line PL2.

In accordance with a signal PWM2 from controller 60, inverter 30 converts the DC voltage received from power line PL2 to a three-phase AC voltage, and outputs the converted three-phase AC voltage to motor generator MG2. Further, inverter 30 converts three-phase AC voltage generated by motor generator MG2 receiving rotational force of driving wheel DW at the time of regenerative braking of the vehicle, in accordance with the signal PWM2 from controller 60, and outputs the converted DC voltage to power line PL2.

The regenerative braking here refers to braking with regeneration through a foot brake operation by a driver of the vehicle, or deceleration (or stopping acceleration) of the vehicle while regenerating power, by releasing the accelerator pedal during running, though the foot brake is not operated.

Here, when an output of commercial AC voltage to a load (not shown, same in the following) connected to connector 50 is requested, inverters 20 and 30 generate a commercial AC voltage across neutral points N1 and N2. Specifically, in order to generate a commercial AC voltage across neutral points N1 and N2, inverter 20 controls the potential of neutral point N1 in accordance with control signal PWM1 from controller 60, and in order to generate a commercial AC voltage across neutral points N1 and N2, inverter 30 controls the potential of neutral point N2 in accordance with control signal PWM2 from controller 60.

Each of motor generators MG1 and MG2 is a three-phase AC electric motor, implemented, for example, by an IPM (Interior Permanent Magnet) type three-phase AC synchronous motor. Motor generator MG1 is coupled to engine ENG, generates a three-phase AC voltage using power of engine ENG, and outputs the generated three-phase AC voltage to inverter 20. Further, motor generator MG1 generates driving force by the three-phase AC voltage received from inverter 20, and starts engine ENG. Motor generator MG2 is coupled to the driving wheel DW of the vehicle, and generates a vehicle driving torque by the three-phase AC voltage received from inverter 30. Further, motor generator MG2 generates a three-phase AC voltage and outputs the voltage to inverter 30, at the time of regenerative braking of the vehicle.

Capacitor C3 removes influence of ripples to the load connected to connector 50. AC port 40 includes a relay for connecting/disconnecting AC output lines ACL1, ACL2 to/from connector 50, and a voltage sensor and a current sensor (both not shown) respectively detecting the AC voltage generated across AC output lines ACL1 and ACL2 and the AC current flowing to AC output lines ACL1 and ACL2. Receiving an output permission command EN from controller 60, AC port 40 turns the relay on, so that connector 50 is electrically connected to AC output lines ACL1 and ACL2. Further, AC port 40 detects a voltage Vac across AC output lines ACL1 and ACL2 and a current Iac supplied to the load connected to connector 50, and outputs the detected voltage Vac and detected current Iac to controller 60.

Connector 50 is an output terminal for outputting the commercial AC voltage generated across neutral points N1 and N2 to the external load, to which a power plug or the like of various electric appliances is connected.

Current sensor 80 detects a motor current I1 flowing through motor generator MG1, and outputs the detected motor current I1 to controller 60. Current sensor 82 detects a motor current I2 flowing through motor generator MG2, and outputs the detected motor current I2 to controller 60.

Based on torque control values TR1 and TR2 and motor rotation numbers ω1 and ω2 of motor generators MG1 and MG2 output from an ECU (Electronic Control Unit), not shown, a voltage Vb from voltage sensor 70 and a voltage Vdc from voltage sensor 72, controller 60 generates the signal PWC for driving boost converter 10, and outputs the generated signal PWC to boost converter 10.

Further, based on the voltage Vdc, torque control value TR1 of motor generator MG1 and motor current I1 from current sensor 80, controller 60 generates a signal PWM1 for driving motor generator MG1, and outputs the generated signal PWM1 to inverter 20. Further, based on voltage Vdc, torque control value TR2 of motor generator MG2 and motor current I2 from current sensor 82, controller 60 generates a signal PWM2 for driving motor generator MG2, and outputs the generated signal PWM2 to inverter 30.

Here, receiving a signal AC at an H (logic high) level requesting an output of the commercial AC voltage to the load connected to connector 50 from the ECU, controller 60 generates the signal PWM1 controlling total sum of switching duties of npn transistors Q11, Q13 and Q15 of the upper arm and npn transistors Q12, Q14 and Q16 of the lower arm of inverter 20, and generates the signal PWM2 controlling total sum of switching duties of npn transistors Q21, Q23 and Q25 of the upper arm and npn transistors Q22, Q24 and Q26 of the lower arm of inverter 30, so as to generate the commercial AC voltage across neutral points N1 and N2. Details of control will be described in detail later. Then, controller 60 outputs the output permission command EN to AC port 40.

Figure 2:
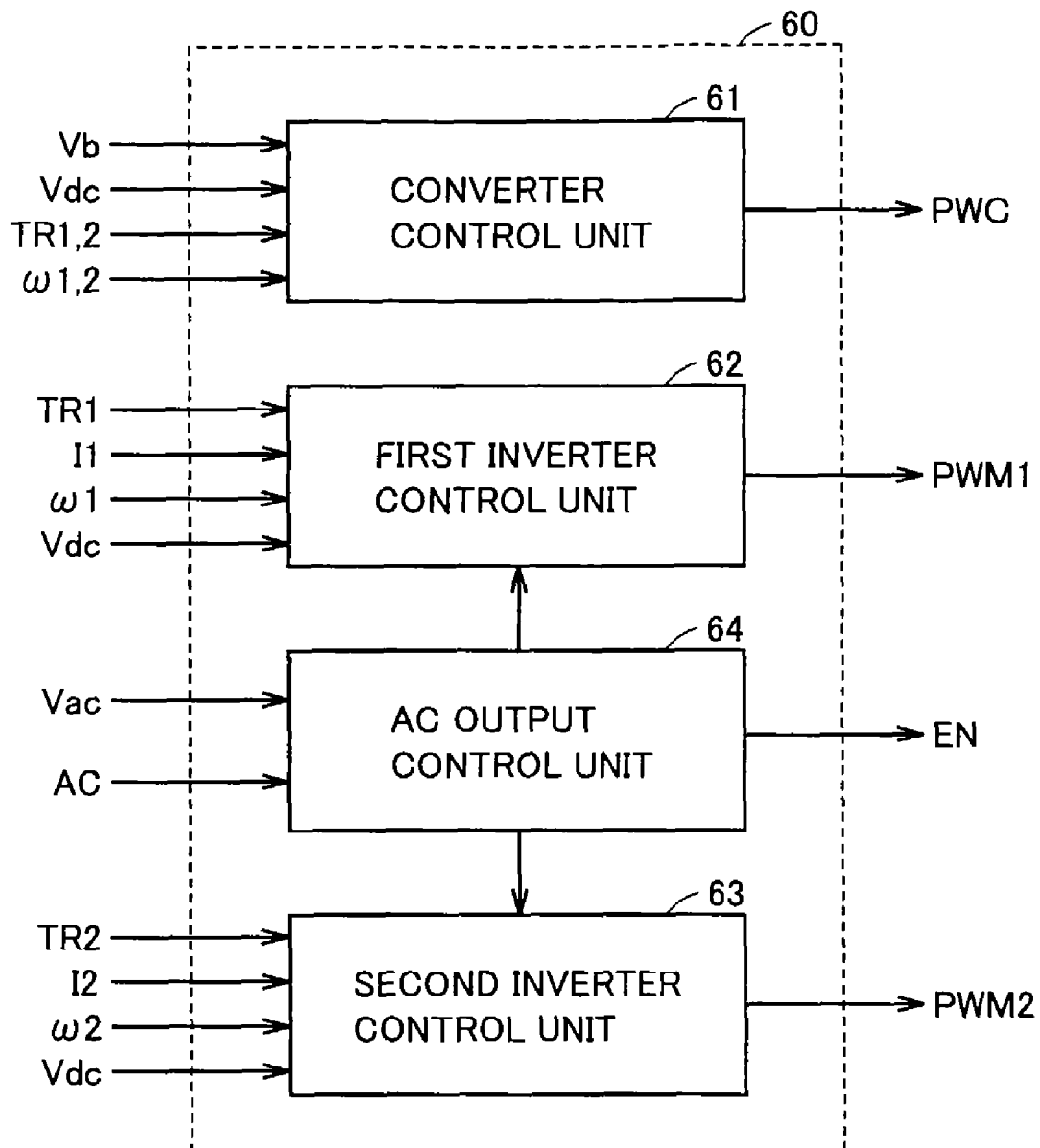
FIG. 2 is a functional block diagram of the controller shown in FIG. 1.

FIG. 2 is a functional block diagram of controller 60 shown in FIG. 1. Referring to FIG. 2, controller 60 includes a converter control unit 61, a first inverter control unit 62, a second inverter control unit 63, and an AC output control unit 64. Converter control unit 61 generates, based on voltages Vb and Vdc, torque control values TR1 and TR2 and motor rotation numbers ω1 and ω2, the signal PWC for turning on/off the npn transistors Q1 and Q2 of boost converter 10, and outputs the generated signal PWC to boost converter 10.

The first inverter control unit 62 generates, based on torque control value TR1, motor current I1 and motor rotation number ω1 of motor generator MG1 and on voltage Vdc, the signal PWM1 for turning on/off the npn transistors Q11 to Q16 of inverter 20, and outputs the generated signal PWM1 to inverter 20.

Here, the first inverter control unit 62 generates, as it receives the AC command voltage for generating the commercial AC voltage across neutral points N1 and N2 from AC output control unit 64, the signal PWM1 while changing the total sum of switching duties of upper and lower arms of inverter 20 based on the received AC command voltage.

The second inverter control unit 63 generates, based on torque control value TR2, motor current I2 and motor rotation number ω2 of motor generator MG2 and on voltage Vdc, the signal PWM2 for turning on/off the npn transistors Q21 to Q26 of inverter 30, and outputs the generated signal PWM2 to inverter 30.

Here, the second inverter control unit 63 generates, as it receives the AC command voltage for generating the commercial AC voltage across neutral points N1 and N2 from AC output control unit 64, the signal PWM2 while changing the total sum of switching duties of upper and lower arms of inverter 30 based on the received AC command voltage.

AC output control unit 64 determines whether or not the commercial AC voltage is to be generated across neutral points N1 and N2 based on a signal AC. Here, the signal AC is, for example, a signal of which logic level changes dependent on an operation of an AC output switch, not shown, and the AC signal at the H level requests output of the commercial AC voltage to the load connected to connector 50.

Receiving the signal AC at the H level, AC output control unit 64 generates the AC command voltage for generating the commercial AC voltage across neutral points N1 and N2 using the voltage Vac detected at AC port 40, and outputs the generated AC command voltage to the first and second inverter control units 62 and 63. Further, receiving the AC signal at the H level, AC output control unit 64 outputs the output permission command EN to AC port 40.

Figure 3:
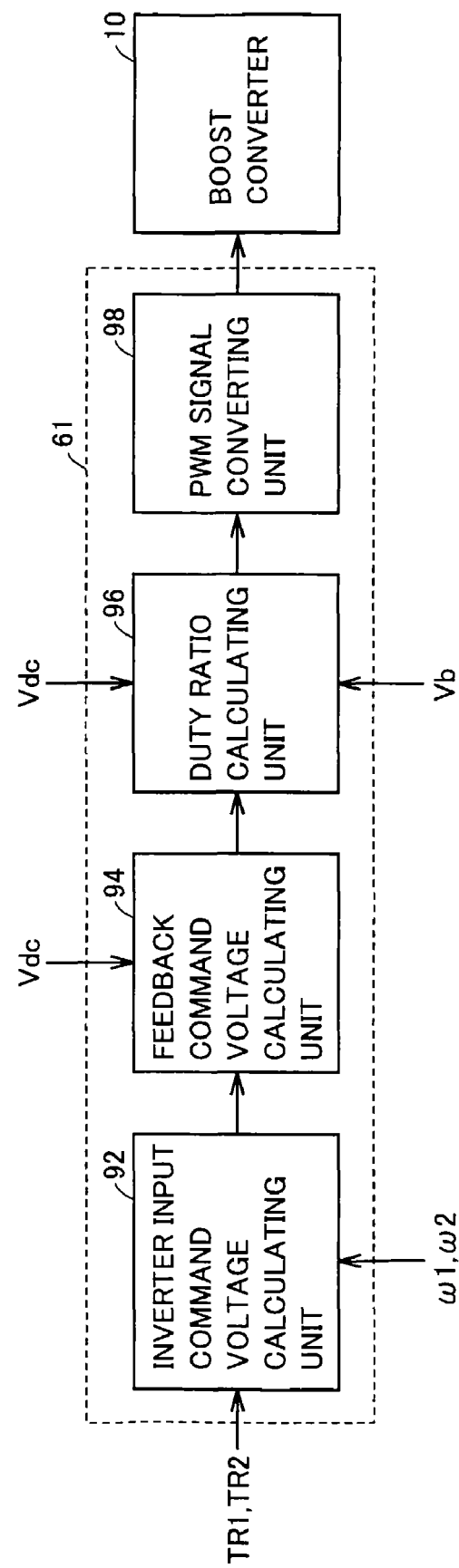
FIG. 3 is a functional block diagram of the converter control unit shown in FIG. 2.

FIG. 3 is a functional block diagram of converter control unit 61 shown in FIG. 2. Referring to FIG. 3, converter control unit 61 includes an inverter input command voltage calculating unit 92, a feedback command voltage calculating unit 94, a duty ratio calculating unit 96, and a PWM signal converting unit 98.

Inverter input command voltage calculating unit 92 calculates, based on the torque control values TR1 and TR2 and motor rotation numbers ω1 and ω2, an optimal value (target value) of inverter input voltage, that is, a command voltage Vdc_com, and outputs the calculated command voltage Vdc_com to feedback command voltage calculating unit 94.

Feedback command voltage calculating unit 94 calculates, based on the voltage Vdc detected by voltage sensor 72 and on the command voltage Vdc_com from inverter input command voltage calculating unit 92, a feedback command voltage Vdc_com_fb for adjusting the voltage Vdc to the command voltage Vdc_com, and outputs the calculated feedback command voltage Vdc_com_fb to duty ratio calculating unit 96.

Duty ratio calculating unit 96 calculates, based on the voltage Vb from voltage sensor 70 and the feedback command voltage Vdc_com_fb from feedback command voltage calculating unit 94, a duty ratio for adjusting the voltage Vdc to the command voltage Vdc_com, and outputs the calculated duty ratio to PWM signal converting unit 98.

Based on the duty ratio received from duty ratio calculating unit 96, PWM signal converting unit 98 generates a PWM (Pulse Width Modulation) signal for turning on/off the npn transistors Q1 and Q2 of boost converter 10, and outputs the generated PWM signal as the signal PWC to npn transistors Q1 and Q2 of boost converter 10.

When the on-duty of npn transistor Q2 of the lower arm of boost converter 10 is enlarged, power accumulation at reactor L increases, and therefore, higher voltage output can be obtained. On the other hand, when the on-duty of npn transistor Q1 of the upper arm is enlarged, the voltage of power line PL2 lowers. Therefore, by adjusting the duty ratio of npn transistors Q1 and Q2, it becomes possible to set the voltage of power line PL2 to an arbitrary voltage not lower than the output voltage of electric storage B.

Figure 4:
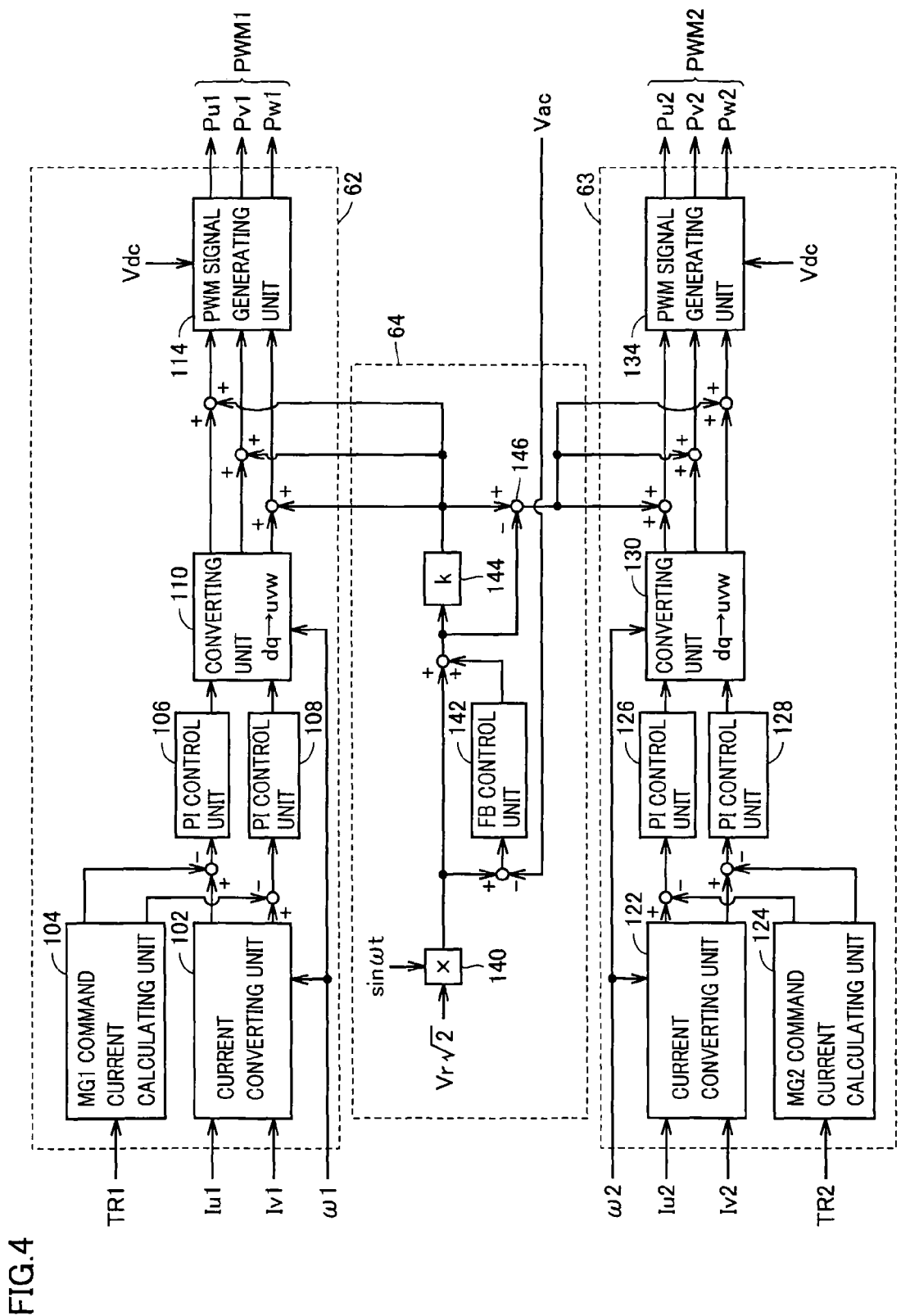
FIG. 4 is a detailed functional block diagram of the first and second inverter control units and an AC output control unit shown in FIG. 2.

FIG. 4 is a detailed functional block diagram of the first and second inverter control units 62 and 63 and AC output control unit 64, shown in FIG. 2. Referring to FIG. 4, the first inverter control unit 62 includes a current converting unit 102, an MG1 command current calculating unit 104, PI control units 106 and 108, a converting unit 110, and a PWM signal generating unit 114.

Current converting unit 102 converts, using the motor rotation number $\omega 1$ of motor generator MG1, a U-phase current Iu1 and a V-phase current Iv1 detected by current sensor 80 to a d-axis current Id1 and a q-axis current Iq1. MG1 command current calculating unit 104 calculates, based on the torque control value TR1 of motor generator MG1, command currents Id1$r$ and Iq1$r$ of motor generator MG1 on the d- and q-axes.

PI control unit 106 receives a deviation between the d-axis current Id1 from current converting unit 102 and the command current Id1$r$ from MG1 command current calculating unit 104, performs a proportional-plus-integral operation using the deviation as an input, and outputs the result of operation to converting unit 110. PI control unit 108 receives a deviation between the q-axis current Iq1 from current converting unit 102 and the command current Iq1$r$ from MG1 command current calculating unit 104, performs a proportional-plus-integral operation using the deviation as an input, and outputs the result of operation to converting unit 110.

Using motor rotation number $\omega 1$, converting unit 110 converts the command voltages on the d- and q-axes received from PI control units 106 and 108, respectively, to U, V and W-phase command voltages.

PWM signal generating unit 114 generates, (based on the voltage Vdc from voltage sensor 72 and on command voltages obtained by superposing AC command voltage from AC output control unit 64 on U, V and W phase command voltages, respectively, from converting unit 110,) PWM signals Pu1, Pv1 and Pw1 corresponding to inverter 20, and outputs the generated signals Pu1, Pv1 and Pw1 as the signal PWM1, to inverter 20.

Here, superposing AC command voltage from AC output control unit 64 uniformly on U, V and W phase command voltages of motor generator MG1 from converting unit 110 corresponds to changing total sum of switching duties of the upper and lower arms of inverter 20 based on the AC command voltage.

The second inverter control unit 63 includes a current converting unit 122, an MG2 command current calculating unit 124, PI control units 126 and 128, a converting unit 130 and a PWM signal generating unit 134. Current converting unit 122 converts, using the motor rotation number $\omega 2$ of motor generator MG2, a U-phase current Iu2 and a V-phase current Iv2 detected by current sensor 82 to a d-axis current Id2 and a q-axis current Iq2. MG2 command current calculating unit 124 calculates, based on the torque control value TR2 of motor generator MG2, command currents Id2$r$ and Iq2$r$ of motor generator MG2 on the d- and q-axes.

PI control unit 126 receives a deviation between the d-axis current Id2 from current converting unit 122 and the command current Id2$r$ from MG2 command current calculating unit 124, performs a proportional-plus-integral operation using the deviation as an input, and outputs the result of operation to converting unit 130. PI control unit 128 receives a deviation between the q-axis current Iq2 from current converting unit 122 and the command current Iq2$r$ from MG2 command current calculating unit 124, performs a proportional-plus-integral operation using the deviation as an input, and outputs the result of operation to converting unit 130.

Using motor rotation number $\omega 2$, converting unit 130 converts the command voltages on the d- and q-axes received from PI control units 126 and 128, respectively, to U, V and W-phase command voltages.

PWM signal generating unit 134 generates, (based on the voltage Vdc and on command voltages obtained by superposing AC command voltage from AC output control unit 64 on respective phase command voltages for motor generator MG2 from converting unit 130,) PWM signals Pu2, Pv2 and Pw2 corresponding to inverter 30, and outputs the generated signals Pu2, Pv2 and Pw2 as the signal PWM2, to inverter 30.

Here, superposing AC command voltage from AC output control unit 64 uniformly on U, V and W phase command voltages of motor generator MG2 from converting unit 130 corresponds to changing total sum of switching duties of the upper and lower arms of inverter 30 based on the AC command voltage.

AC output control unit 64 includes multiplication units 140 and 144, an FB control unit 142 and a subtraction unit 146. Multiplication unit 140 multiplies a crest value Vr$\sqrt{2}$ of the commercial AC voltage generated across neutral points N1 and N2 by a sinusoidal wave signal sin $\omega$, to generate a reference value Vacr for the commercial AC voltage. Here, $\omega$ represents the frequency of the commercial power source.

FB control unit 142 performs a feedback operation based on a deviation between the reference value Vacr output from multiplication unit 140 and the voltage Vac detected at AC port 40, and outputs the result of operation. Here, various known methods (including proportional-plus-integral control) may be used for the feedback operation.

Multiplication unit 144 multiplies by k (k is a constant of at least 0 and at most 1) the value obtained by adding the output value of FB control unit 142 to the reference value Vacr, and outputs the result of operation as the AC command voltage for the first inverter control unit 62, to the first inverter control unit 62. Subtraction unit 146 subtracts the input value of multiplication unit 144 from the output value of multiplication unit 144, and outputs the result of operation as the AC command voltage for the second inverter control unit 63, to the second inverter control unit 63.

Specifically, the AC command voltage obtained by adding the result of operation of FB control unit 142 to the reference value Vacr is multiplied by k and output to the first inverter control unit 62, and multiplied by $-(1-k)$ and output to the second inverter control unit 63. Specifically, k is a voltage burden ratio between inverters 20 and 30 when the commercial AC voltage is generated across neutral points N1 and N2, and when the value k exceeds 0.5, the voltage burden on inverter 20 becomes large and when k is smaller than 0.5, the voltage burden on inverter 30 becomes large.

The value k may be determined based on the loads on motor generators MG1 and MG2. For instance, assuming that power is generated by motor generator MG1 and the commercial AC voltage is generated across neutral points N1 and N2 while the vehicle is stopped, the value k may be set smaller than 0.5, so that motor generator MG2 mainly bears the burden of generating the commercial AC voltage, allowing motor generator MG1 to generate a large power (high voltage).

Though not specifically shown, AC output control unit 64 outputs the generated AC command voltage to the first and second inverter control units 62 and 63 when it receives the signal AC at the H level, and output the AC command voltage of 0 to the first and second inverter control units 62 and 63 when it receives the signal AC at the L level.

Figure 5:
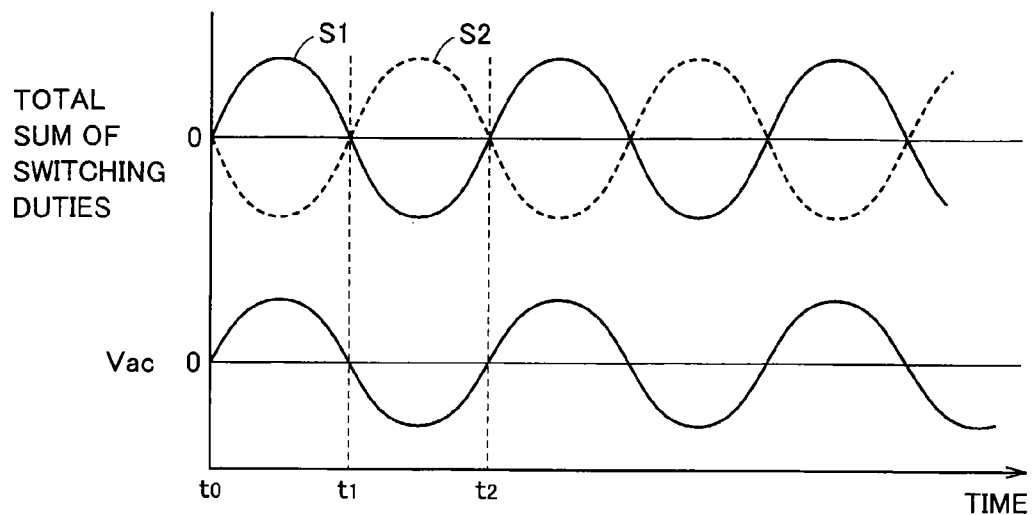
FIG. 5 shows total sum of switching duties of the inverters and the waveform of voltage generated across the neutral points.

FIG. 5 shows the total sum of switching duties of inverters 20 and 30 as well as the waveform of voltage Vac generated across neutral points N1 and N2. Referring to FIG. 5, the curve S1 represents the variation in total sum of switching duties of upper and lower arms of inverter 20, and the curve S2 represents the variation in total sum of switching duties of upper and lower arms of inverter 30.

Here, the total sum of switching duties refers to the value obtained by subtracting the on-duty of the lower arm from the on-duty of the upper arm of each inverter. FIG. 5 shows that, when the total sum of switching duties is positive, the potential at the neutral point of the corresponding motor generator attains higher than the intermediate potential Vdc/2 of the input voltage Vdc of the inverter, and when the total sum of switching duties is negative, the potential at the neutral point attains lower than the intermediate potential Vdc/2.

In the AC voltage output apparatus 100, as shown in FIG. 4, the AC command voltage output from AC output control unit 64 to the first inverter control unit 62 is uniformly superposed on the U-, V- and W-phase command voltages of motor generator MG1, whereby the total sum of switching duties of inverter 20 is changed periodically at the commercial power source frequency ω, along the curve S1. Further, the AC command voltage output from AC output control unit 64 to the second inverter control unit 63 is uniformly superposed on the U-, V- and W-phase command voltages of motor generator MG2, whereby the total sum of switching duties of inverter 30 is changed periodically at the commercial power source frequency ω, along the curve S2.

It is noted that in FIG. 5, an example where the value k determining the voltage burden ratio between motor generators MG1 and MG2 is 0.5 is shown. Therefore, the phase of curve S2 is just the opposite of the phase of curve S1. When the value k is set larger than 0.5, the amplitude of curve S1 becomes larger and the amplitude of curve S2 becomes smaller, and when the value k is set smaller than 0.5, the amplitude of curve S1 becomes smaller and the amplitude of curve S2 becomes larger.

At time t0 to t1, the potential at neutral point N1 of motor generator MG1 is higher than the intermediate potential Vcd/2 of voltage Vdc, the potential at neutral point N2 of motor generator MG2 becomes lower than the intermediate potential Vdc/2, and a positive commercial AC voltage is generated across neutral points N1 and N2. When there is a load connected to connector 50, excess current that cannot flow from the upper arm to the lower arm of inverter 20 flows from neutral point N1 through AC output line ACL1, the load and AC output line ACL2 to neutral point N2, and then from neutral point N2 to the lower arms of respective phases of inverter 30.

At time t1 to t2, the potential at neutral point N1 becomes lower than the intermediate potential Vdc/2 and the potential at neutral point N2 of motor generator MG2 becomes higher than the intermediate potential Vdc/2, and a negative commercial AC voltage is generated across neutral points N1 and N2. Thus, a current flows from upper arms of respective phases of inverter 30 through neutral point N2, AC output line ACL2, the load and AC output line ACL1 to neutral point N1, and from neutral point N1 to the lower arm of inverter 20.

In this manner, the commercial AC voltage is generated across neutral points N1 and N2 of motor generators MG1 and MG2.

As described above, in the first embodiment, it is possible to generate a commercial AC voltage across the neutral point N1 of a three-phase coil 12 of motor generator MG1 and the neutral point N2 of a three-phase coil 14 of motor generator MG2, and to supply the voltage to a load connected to connector 50.

In this operation, it is possible to change the voltage burden on inverters 20 and 30 to generate the commercial AC voltage across neutral points N1 and N2, using the voltage burden ratio k at AC output control unit 64. Therefore, concentration of voltage burden to inverter 20 or 30 can be avoided, and hence, waveform distortion of commercial AC voltage can be avoided.

Further, in the first embodiment, the commercial AC voltage is generated across neutral points N1 and N2 and output to the load, and therefore, a dedicated inverter for generating the commercial AC voltage is unnecessary.

Second Embodiment

In the first embodiment, the AC voltage reference value Vacr of sinusoidal wave is generated at multiplication unit 140 and feedback control is performed based on the deviation between the generated reference value Vacr and the voltage Vac detected at AC port 40, as shown in FIG. 4. Though the feedback control is common, high follow-up capability is required, as the voltage Vac must be adjusted to the reference value Vacr that varies at the commercial power source frequency ω. As a result, high-response control becomes necessary, while stable control may become difficult. Further, in order to realize high response, high speed operation is necessary. In view of the above, feedback control putting weight on stability is developed in the second embodiment.

The overall configuration of the AC voltage output apparatus in accordance with the second embodiment is the same as that of AC voltage output apparatus 100 in accordance with the first embodiment shown in FIG. 1.

Figure 6:
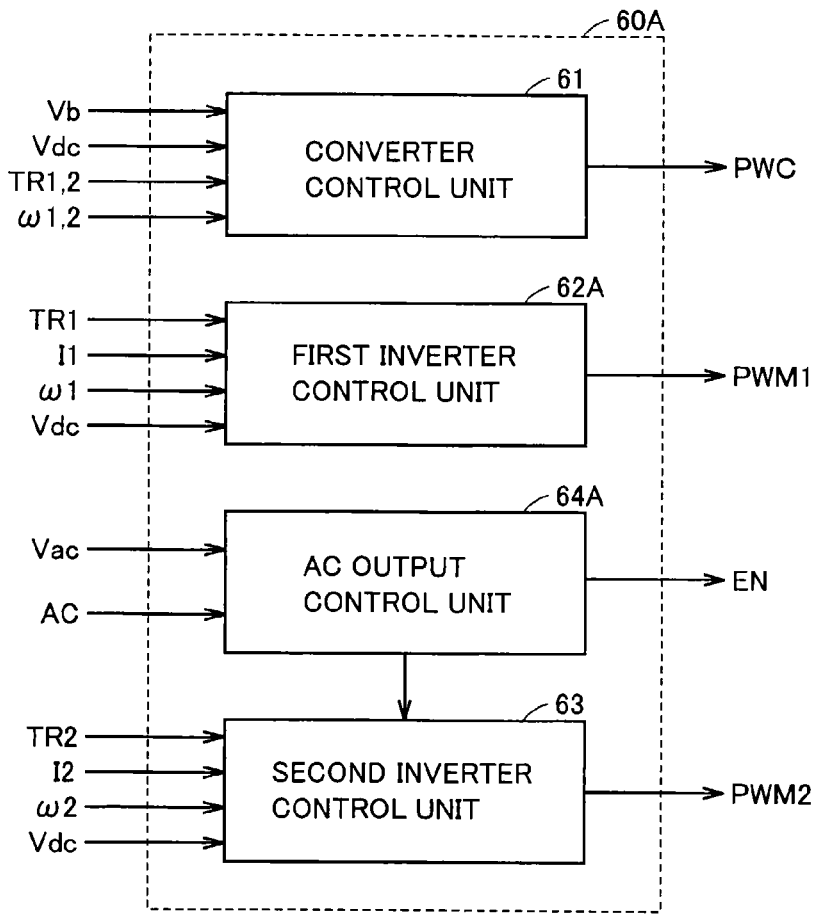
FIG. 6 is a functional block diagram of the controller in accordance with a second embodiment.

FIG. 6 is a functional block diagram of the controller in accordance with the second embodiment. Referring to FIG. 6, a controller 60A includes, in the configuration of controller 60 of the first embodiment shown in FIG. 2, a first inverter control unit 62A and an AC output control unit 64A, in place of the first inverter control unit 62 and the AC output control unit 64, respectively. The first inverter control unit 62A is different from the first inverter control unit 62 only in that it does not receive the AC command voltage, and except for this point, the configuration is the same as that of the first inverter control unit 62.

AC output control unit 64A calculates, when it receives the signal AC at the H level, an average value of voltages Vac detected at AC port 40. Using the calculated average value of voltages Vac, AC output control unit 64A generates an AC command voltage for generating a commercial AC voltage across neutral points N1 and N2, and outputs the generated AC command voltage to the second inverter control unit 63.

Figure 7:
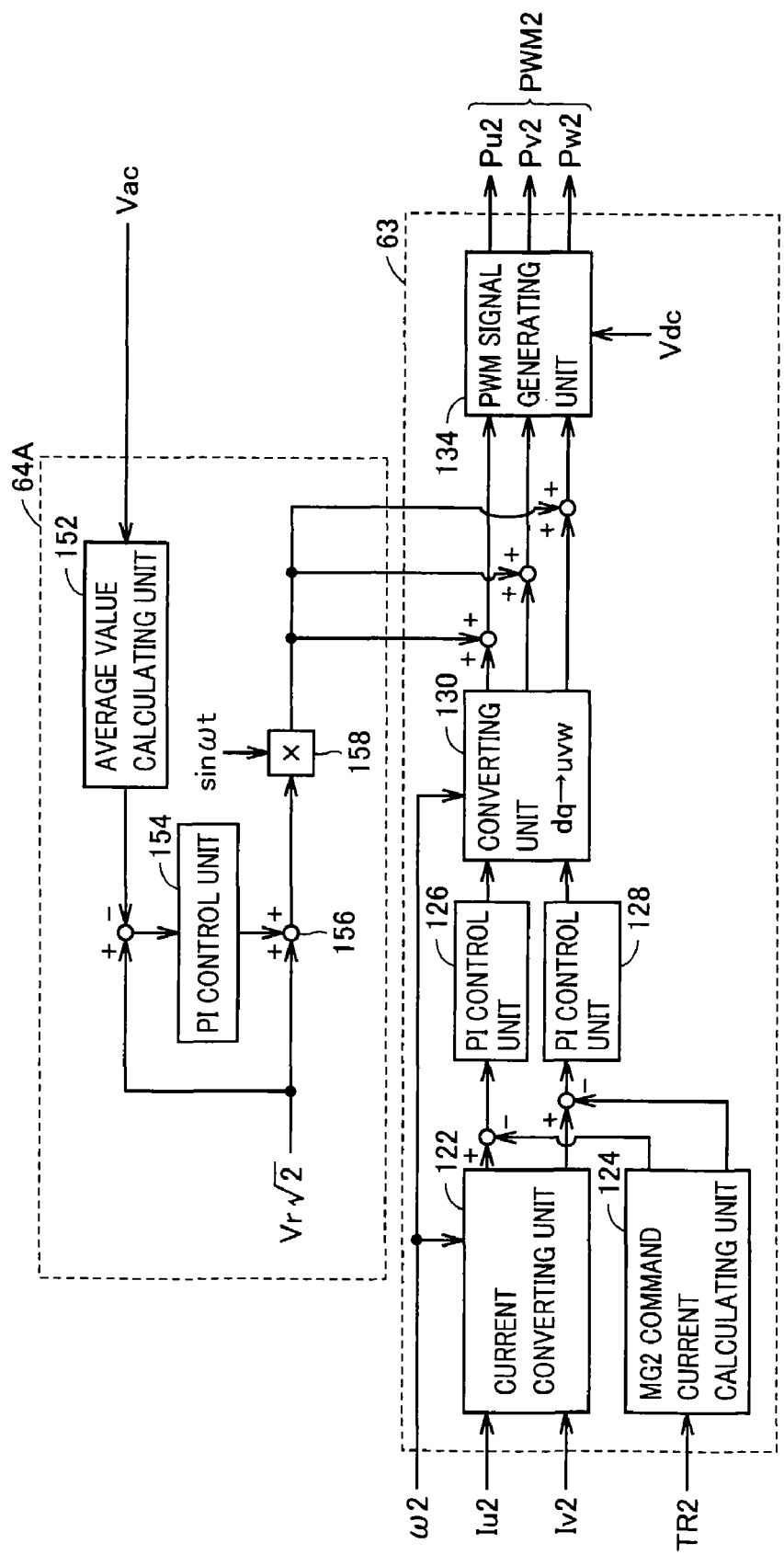
FIG. 7 is a detailed functional block diagram of the second inverter control unit and the AC output control unit shown in FIG. 6.

FIG. 7 is a detailed functional block diagram of the second inverter control unit 63 and AC output control unit 64A shown in FIG. 6. Referring to FIG. 7, AC output control unit 64A includes an average value calculating unit 152, a PI control unit 154, an addition unit 156, and a multiplication unit 158. Average value calculating unit 152 calculates an average value of magnitude of voltages Vac detected at AC port 40. By way of example, average value calculating unit 152 integrates the absolute values of voltage Vac for several periods, divides the integrated value by the number of sampling, and multiplies the result by a conversion efficient, whereby the average magnitude (based on crest value) of voltage Vac is calculated.

PI control unit 154 performs a proportional-plus-integral operation based on a deviation between a crest reference value Vr√2 indicating a target magnitude of commercial AC voltage generated across the neutral points N1 and N2 and the output value of average value calculating unit 152, and outputs the result of operation to addition unit 156.

Addition unit 156 adds the output value of PI control unit 154 to crest reference value Vr√2, and outputs the result of operation to multiplication unit 158. Multiplication unit 158 multiplies the output value of addition unit 156 by sinusoidal wave signal sin ωt, and outputs the result of operation as the AC command voltage to the second inverter control unit 63.

In AC output control unit 64A, feedback control not on the instantaneous value of voltage Vac but on the average value of voltage Vac is performed. As the feedback control based on the average value of voltage Vac is a constant value control, stability is higher than feedback control based on the instantaneous value of voltage Vac, in which the reference value is a sinusoidal wave.

In the foregoing, inverter 30 bears all the burden of generating the AC voltage, and inverter 20 does not at all bear the burden of generating the AC voltage. The potential at neutral point N1 of the first motor generator MG1 corresponding to inverter 20 is constantly kept at the intermediate potential Vdc/2 of voltage Vdc, no matter whether the AC voltage is to be generated or not.

Further, in the foregoing, it is assumed that the AC command voltage is output to the second inverter control unit 63. Alternatively, the AC command voltage may be output to the first inverter control unit and inverter 20 may bear the burden of generating the AC voltage. Alternatively, the burden of generating AC voltage may be shared by inverters 20 and 30 in accordance with the voltage burden ratio, as in the first embodiment.

As described above, according to the second embodiment, control stability can be improved as compared with the first embodiment in which feedback control is done based on the instantaneous value of voltage Vac.

Third Embodiment

In the third embodiment, in addition to the approach of the second embodiment, feedback control based on the instantaneous value of voltage Vac is performed, and amount of compensation thereof is input to the first inverter control unit. Thus, subtle deviation that cannot be removed by the feedback control based on the average value of voltage Vac can be eliminated.

The overall configuration of AC voltage output apparatus in accordance with the third embodiment is the same as that of AC voltage output apparatus 100 of the first embodiment shown in FIG. 1. Further, the configurations of the converter control unit and of first and second inverter control units in accordance with the third embodiment are the same as those of converter control unit 61 and the first and second inverter control units 62 and 63 of the first embodiment shown in FIGS. 2 to 4.

Figure 8:
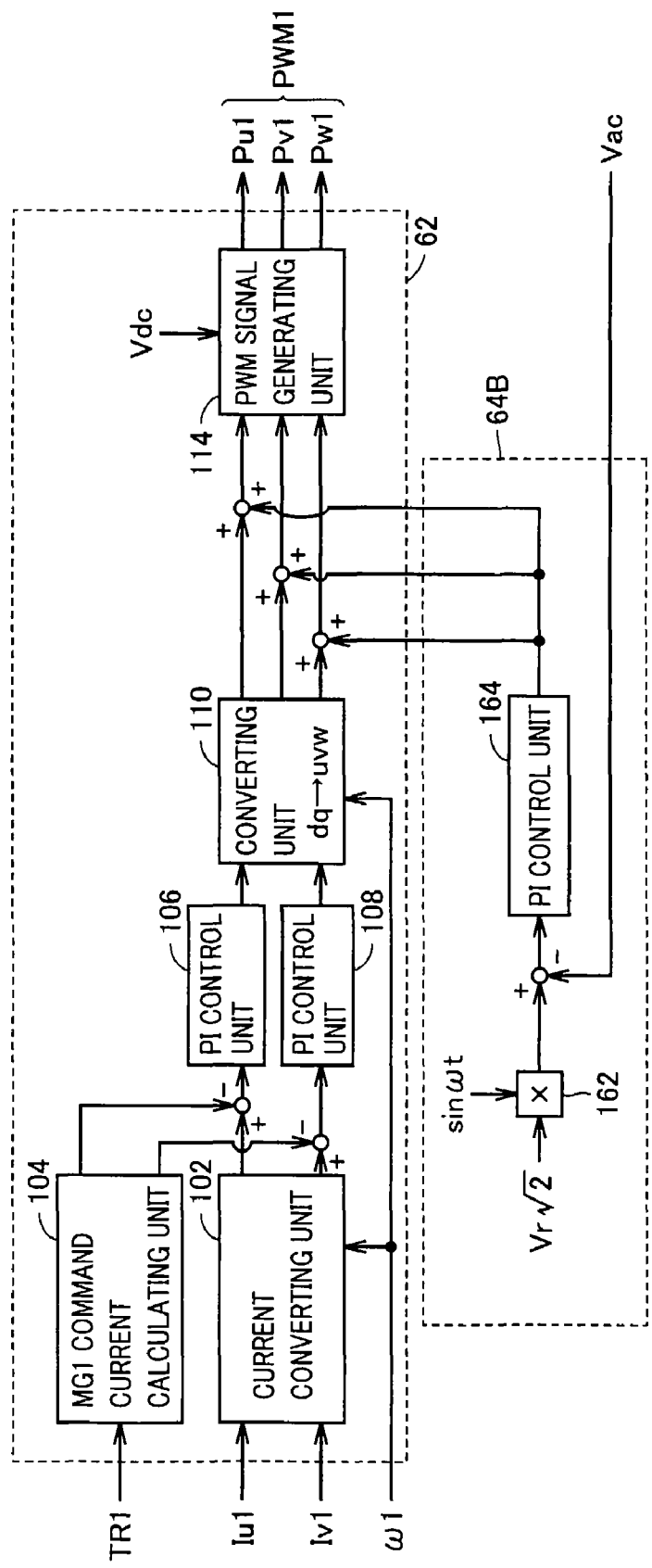
FIG. 8 is a detailed functional block diagram of the first inverter control unit and the AC output control unit in accordance with a third embodiment.

FIG. 8 is a detailed functional block diagram of the first inverter control unit 62 and AC output control unit 64B in accordance with the third embodiment. Referring to FIG. 8, AC output control unit 64B includes, in addition to the configuration (not shown) of AC output control unit 64A of FIG. 7, a multiplication unit 162 and a PI control unit 164.

Multiplication unit 162 multiplies a crest value Vr√2 of the commercial AC voltage generated across neutral points N1 and N2 by a sinusoidal wave signal sin ωt, to generate a reference value Vacr for the commercial AC voltage. PI control unit 164 performs a proportional-plus-integral operation based on a deviation between the reference value Vacr output from multiplication unit 162 and the voltage Vac detected at AC port 40, and outputs the result of operation to the first inverter control unit 62.

PWM signal generating unit 114 of the first inverter control unit 62 generates, based on the command voltages obtained by superposing the amount of compensation from PI control unit 164 on respective phase command voltages for motor generator MG1 from converting unit 110, PWM signals Pu1, Pv1 and Pw1 corresponding to inverter 20, and outputs the generated signals Pu1, Pv1 and Pw1 as the signal PWM1, to inverter 20.

In AC output control unit 64B, the amount of compensation of feedback control based on the average value of voltage Vac is output to the second inverter control unit 63, and the amount of compensation of feedback control based on the instantaneous value of voltage Vac is output to the first inverter control unit 62. As to the functions allocated to respective feedback control, the feedback control based on the average value of voltage Vac is to remove large deviation, and the feedback control based on the instantaneous value of voltage Vac is to remove subtle deviation that cannot be sufficiently removed by the feedback control based on the average value.

In an operation mode in which power is generated by motor generator MG1 and the commercial AC voltage is generated across neutral points N1 and N2 while the vehicle is stopped, the AC command voltage is output to the second inverter control unit 63 corresponding to inverter 30 that has wider voltage margin as it does not drive the motor. On the other hand, to the first inverter control unit 62 corresponding to inverter 20 having narrower voltage margin because of regenerative driving, the output resulting from feedback control based on the instantaneous value of voltage Vac with smaller amount of compensation is applied. Specifically, two different types of feedback control are realized assuming the state of operation in which power is generated by motor generator MG1 and the commercial AC voltage is generated across neutral points N1 and N2 while the vehicle is stopped.

The first inverter control unit 62 and the feedback control based on the instantaneous value of voltage Vac in AC output control unit 64B is executed by a first CPU (Central Processing Unit), and the second inverter control unit 63 and the feedback control based on the average value of voltage Vac in AC output control unit 64B is executed by a second CPU different from the first CPU. Thus, computational burden is appropriately shared by the two CPUs.

As described above, according to the third embodiment, appropriate feedback control considering loads on motor generators MG1 and MG2 at the time of generating the commercial AC voltage can be realized. Further, computational burden can be appropriately shared by two CPUs.

Fourth Embodiment

In switching control of inverters 20 and 30, dead time is generally provided as described above, and by the influence of the dead time, waveform distortion occurs near the zero-cross point of the AC voltage. Particularly in a large power inverter such as used for a hybrid vehicle, the dead time is often set longer, resulting in more serious waveform distortion. The fourth embodiment is directed to suppress such waveform distortion periodically generated by the influence of the dead time of inverters.

The overall configuration of AC voltage output apparatus in accordance with the fourth embodiment is the same as that of AC voltage output apparatus 100 of the first embodiment shown in FIG. 1. Further, the converter control unit in accordance with the fourth embodiment is the same as converter control unit 61 of the first embodiment shown in FIG. 3, and the first inverter control unit is the same as the first inverter control unit 62A in accordance with the second embodiment.

Figure 9:
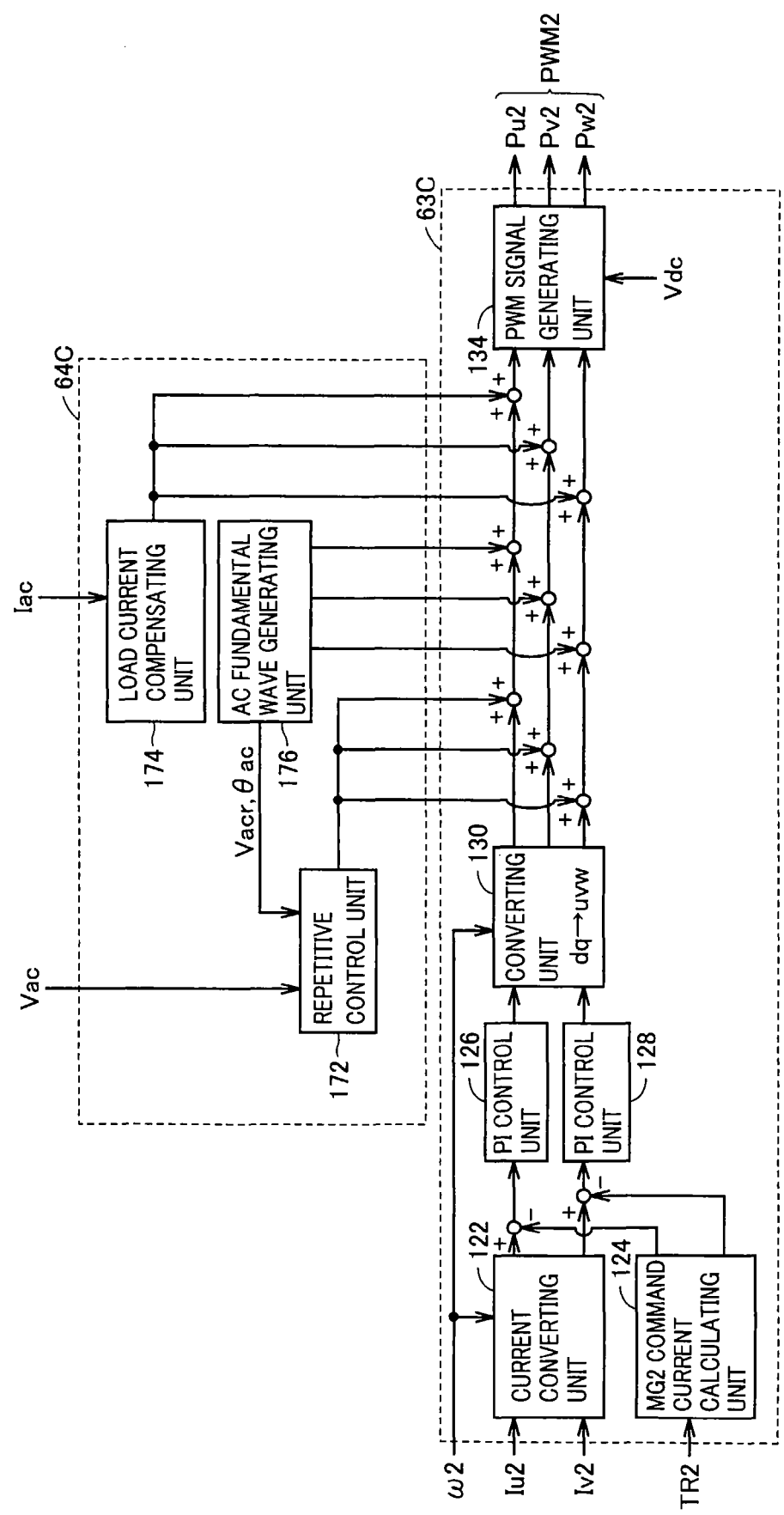
FIG. 9 is a detailed functional block diagram of the second inverter control unit and the AC output control unit in accordance with a fourth embodiment.

FIG. 9 is a detailed functional block diagram of the second inverter control unit 63C and AC output control unit 64C in accordance with the fourth embodiment. Referring to FIG. 9, AC output control unit 64C includes a repetitive control unit 172, a load current compensating unit 174 and an AC fundamental wave generating unit 176.

AC fundamental wave generating unit 176 generates an AC command voltage Vacr for generating a commercial AC voltage across neutral points N1 and N2, and outputs the generated AC command voltage Vacr to the second inverter control unit 63C. Further, AC fundamental wave generating unit 176 outputs the generated AC command voltage Vacr and the phase θac of generated AC command voltage Vacr output to the second inverter control unit 63C to repetitive control unit 172.

Repetitive control unit 172 receives the AC command voltage Vacr and its phase θac from AC fundamental wave generating unit 176, and receives the voltage Vac from AC port 40. Repetitive control unit 172 calculates an amount of compensation in accordance with the phase θac by a method described later, and outputs the calculated amount of compensation to the second inverter control unit 63C.

Figure 10:
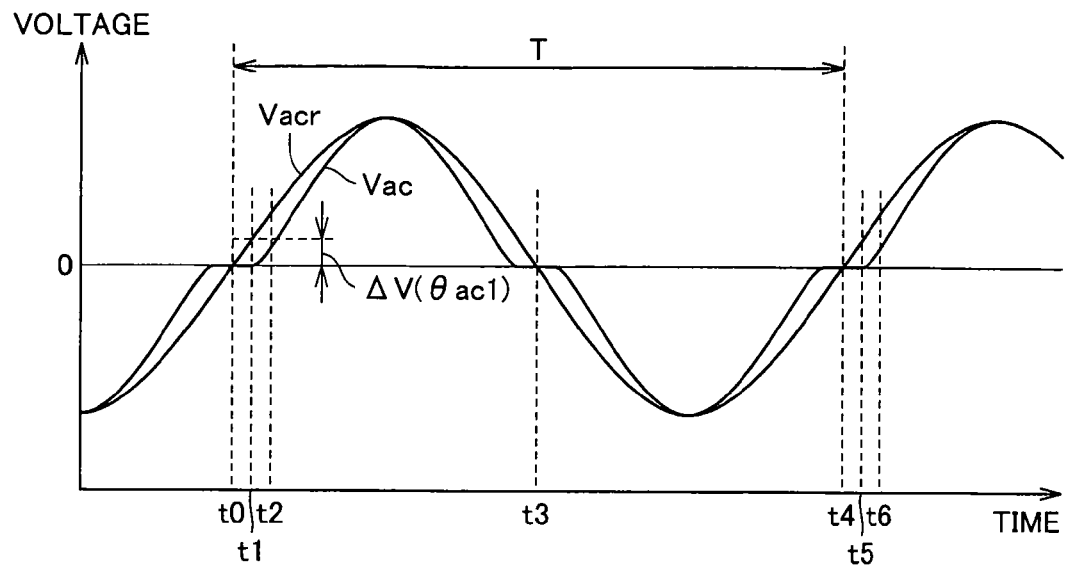
FIG. 10 illustrates the concept of control by the repetitive control unit shown in FIG. 9.

FIG. 10 shows the concept of control by the repetitive control unit 172 shown in FIG. 9. In FIG. 10, the ordinate and the abscissa represent voltage and time, respectively, and time-variations of AC command voltage Vacr and the actual value of voltage Vac are plotted. It is noted that FIG. 10 shows the voltage Vac when the control by repetitive control unit 172 is not performed.

Because of the influence of dead time of inverters 20 and 30, waveform distortion of voltage Vac is periodically observed near the zero-cross points at time points t0, t3 and t4, and further away from the zero-cross points, the distortion becomes smaller. When the control gain is increased to suppress distortion near the zero-cross point in general PI control or the like, an overshoot or hunting occurs, possibly resulting in unstable control. On the other hand, when the control gain is reduced, the distortion near the zero-cross point cannot sufficiently be suppressed.

In view of the foregoing, the amount of compensation is calculated based on a deviation ΔV (θac1) between AC command voltage Vacr and voltage Vac at a time point t1 corresponding to a certain phase θac1, and the calculated amount of compensation is output at a time point t5 corresponding to the phase θac1 after one cycle. Further, the amount of compensation is calculated based on a deviation ΔV (θac2) (not shown) between AC command voltage Vacr and voltage Vac at a time point t2 corresponding to a certain phase θac2, and the calculated amount of compensation is output at a time point t6 corresponding to the phase θac2 after one cycle. Such control is repeatedly executed phase by phase.

In other words, the amount of compensation is calculated based on the deviation in an immediately preceding cycle between the AC command voltage Vacr and voltage Vac. This calculation is repeated in accordance with the phase θac of AC voltage. Specifically, according to the control, based on the deviation in an immediately preceding cycle, the amount of compensation at the same phase of the next cycle is determined, and therefore, the control is effective to suppress periodic disturbance such as the disturbance experienced near every zero-cross point because of the influence of inverter dead time.

Figure 11:
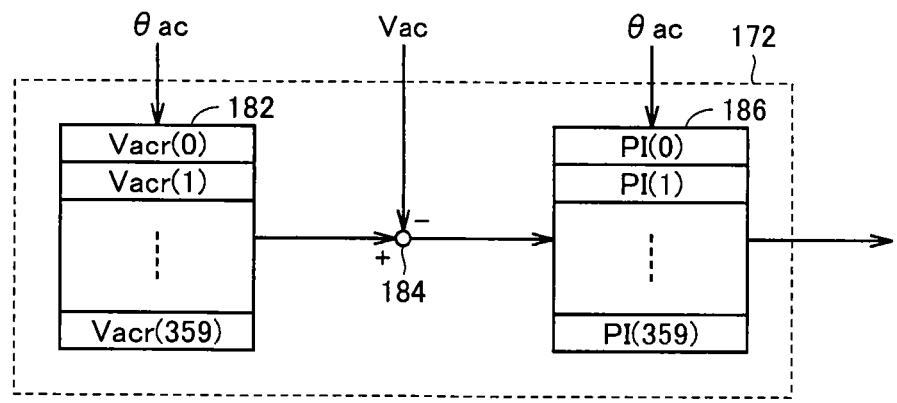
FIG. 11 is a detailed functional block diagram of the repetitive control unit shown in FIG. 9.

FIG. 11 is a detailed functional block diagram of repetitive control unit 172 shown in FIG. 9. Referring to FIG. 11, repetitive control unit 172 includes an AC command voltage value table 182, a subtraction unit 184, and a PI table 186. AC command voltage value table 182 receives the AC command voltage Vacr and its phase θac from AC fundamental wave generating unit 176, and stores phase-by-phase values (for example, value for every one degree) Vacr (0) to Vacr (359) of AC command voltage Vacr. Then, AC command voltage value table 182 reads the stored value in accordance with the phase θac and outputs the read value to subtraction unit 184.

Subtraction unit 184 subtracts the voltage Vac from the AC command voltage Vacr read from AC command voltage value table 182, and outputs the result of operation to PI table 186.

PI table 186 has PI control gain of each phase (for example, of every one degree). In accordance with the phase θac, PI table 186 multiplies the corresponding PI control gain by the output value of subtraction unit 184 to calculate the amount of compensation, and stores the calculated amount of compensation in the table corresponding to the phase θac. In the next cycle of the AC voltage, PI table 186 reads the value of the table in accordance with the phase θac, and outputs the read value to the second inverter control unit 63 as the amount of compensation.

Again referring to FIG. 9, load current compensating unit 174 calculates the amount of compensation based on the amount of change in current Iac detected at AC port 40, and outputs the calculated amount of compensation to the second inverter control unit 63C.

In the repetitive control unit 172, there is a wasted time corresponding to one cycle of AC voltage. Therefore, the control is not of high response. Therefore, in order to suppress abrupt distortion of AC voltage caused by load variation, load current compensating unit 174 is provided.

Figure 12:
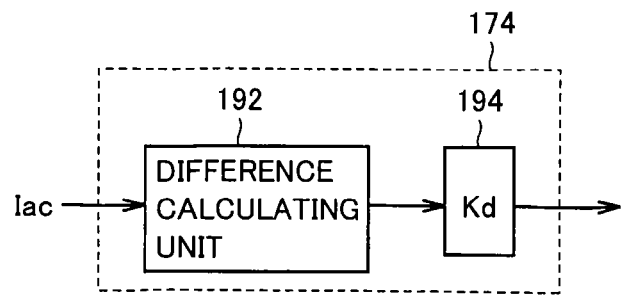
FIG. 12 is a detailed functional block diagram of the load current compensating unit shown in FIG. 9.

FIG. 12 is a detailed functional block diagram of load current compensating unit 174 shown in FIG. 9. Referring to FIG. 12, load current compensating unit 174 includes a difference calculating unit 192 and a multiplication unit 194. Difference calculating unit 192 receives the current Iac to be applied to the load connected to connector 50, detected by AC port 40, from AC port 40, and calculates the difference between the last received current Iac and the presently received current Iac. Specifically, difference calculating unit 192 calculates the amount of change in the load current flowing to the load.

Multiplication unit 194 multiplies the output value of difference calculating unit 192 by a prescribed gain Kd, and outputs the result of operation to the second inverter control unit 63C as the amount of compensation. This realizes the voltage compensation reflecting the amount of change in the current flowing to the load.

Again referring to FIG. 9, the PWM signal generating unit 134 of the second inverter control unit 63C generates, based on the command voltages obtained by superposing AC command voltage from AC fundamental wave generating unit 176 and amounts of compensation from repetitive control unit 172 and from load current compensating unit 174 on respective phase command voltages for motor generator MG2 from converting unit 130, PWM signals Pu2, Pv2 and Pw2 corresponding to inverter 30, and outputs the generated signals Pu2, Pv2 and Pw2 as the signal PWM2, to inverter 30.

Though the sampling interval of phase in AC command voltage value table 182 and PI table 186 in repetitive control unit 172 is set to 1 degree, the phase sampling interval is not limited thereto, an it may be appropriately set in consideration of required precision of control or processing capacity.

As described above, according to the fourth embodiment, waveform distortion of the AC voltage caused by the influence of dead time of inverters 20 and 30 can be suppressed by repetitive control unit 172. Further, waveform distortion of the AC voltage cause by abrupt load variation can be suppressed by load current compensating unit 174.

In the first to fourth embodiments described above, the AC voltage output apparatus is described as including boost converter 10. The present invention, however, is applicable to a system not including boost converter 10.

In the foregoing, the AC voltage output apparatus is described as being mounted on a hybrid vehicle. Application of the present invention is not limited thereto, and the AC voltage output apparatus may be mounted on an electric vehicle or a fuel-cell vehicle. The present invention is generally applicable to one using two motor generators. Further, when the AC voltage output apparatus of the present invention is mounted on an electric vehicle or a fuel-cell vehicle, motor generators MG1 and MG2 are coupled to the driving wheel of the electric vehicle or the fuel-cell vehicle.

In the foregoing, motor generators MG1 and MG2 correspond to "the first poly-phase AC electric motor" and "the second poly-phase AC electric motor," and three-phase coils 12 and 14 corresponds to "the first poly-phase winding" and "the second poly-phase winding" of the present invention. Inverters 20 and 30 correspond to "the first inverter" and "the second inverter" of the present invention, and the first and second inverter control unit 62 and 63 constitute "the inverter control unit" of the present invention. Further, AC output control units 64, 64A to 64C correspond to "the AC command voltage generating unit," and multiplication unit 144 and subtraction unit 146 constitute "the distributing unit" of the present invention. Further, AC port 40 corresponds to "the voltage detecting unit" of the present invention, and FB control unit 142 corresponds to "the feedback operating unit" of the present invention.

Further, the first and second inverter control units 62 and 63 correspond to "the first inverter control unit" and "the second inverter control unit" of the present invention, and average value calculating unit 152, PI control unit 154, addition unit 156 and multiplication unit 158 constitute "the first feedback operating unit" of the present invention. Further, PI control unit 164 corresponds to "the second feedback operating unit" of the present invention, and engine ENG corresponds to "the internal combustion engine" of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. An AC voltage output apparatus, comprising:
    a first poly-phase AC electric motor including a star-connected first poly-phase winding as a stator winding;
    a second poly-phase AC electric motor including a star-connected second poly-phase winding as a stator winding;
    first and second inverters respectively connected to said first and second poly-phase windings;
    inverter control means for controlling said first and second inverters; and
    AC command voltage generating means for generating an AC command voltage for generating an AC voltage across a first neutral point of said first poly-phase winding and a second neutral point of said second poly-phase winding; wherein
    said AC command voltage generating means includes distributing means for distributing said AC command voltage to first and second AC command voltages based on a voltage burden ratio indicating ratio of voltage burdens to be borne by the first and second inverters for generating said AC voltage; and
    said inverter control means controls said first inverter based on a command voltage obtained by superposing said first AC command voltage on a command voltage of each phase for said first poly-phase AC electric motor, and controls said second inverter based on a command voltage obtained by superposing said second AC command voltage on a command voltage of each phase for said second poly-phase AC electric motor.

2. The AC voltage output apparatus according to claim 1, wherein said voltage burden ratio is set in accordance with driving load on said first and second poly-phase AC electric motors.

3. The AC voltage output apparatus according to claim 1, further comprising
    voltage detecting means for detecting a voltage across said first and second neutral points; wherein
    said AC command voltage generating means further includes a feedback operating unit calculating an amount of compensation based on a deviation between a reference voltage indicating a target of said AC voltage and the voltage detected by said voltage detecting means, and compensating for said reference voltage using the calculated amount of compensation to generate said AC command voltage.

4. An AC voltage output apparatus, comprising:
    a first poly-phase AC electric motor including a star-connected first poly-phase winding as a stator winding;
    a second poly-phase AC electric motor including a star-connected second poly-phase winding as a stator winding;
    first and second inverters respectively connected to said first and second poly-phase windings;
    first and second inverter control means for controlling said first and second inverters respectively;
    AC command voltage generating means for generating an AC command voltage for generating an AC voltage across a first neutral point of said first poly-phase winding and a second neutral point of said second poly-phase winding; and
    voltage detecting means for detecting a voltage across said first and second neutral points; wherein
    said AC command voltage generating means includes a first feedback operating unit calculating a first amount of compensation based on a deviation between an average value of magnitude of voltages detected by said voltage detecting means and a reference value indicating a target of the average value, and generating said AC command voltage based on said reference value compensated for by using the calculated first amount of compensation;
    said first inverter control means controls said first inverter based on a command voltage of each phase for said first poly-phase AC electric motor; and
    said second inverter control means controls said second inverter based on a command voltage obtained by superposing said AC command voltage on a command voltage of each phase for said second poly-phase AC electric motor.

5. The AC voltage output apparatus according to claim 4, wherein
said AC command voltage generating means further includes a second feedback operating unit calculating a second amount of compensation based on the deviation between a reference voltage indicating a target of said AC voltage and the voltage detected by said voltage detecting means; and
said first inverter control means controls said first inverter based on a command voltage obtained by superposing said second amount of compensation on the command voltage of each phase for said first poly-phase AC electric motor.

6. The AC voltage output apparatus according to claim 5, wherein
said first inverter control means and said second feedback operating unit are mounted on a first processing apparatus; and
said second inverter control means and said first feedback operating unit are mounted on a second processing apparatus.

7. An AC voltage output apparatus, comprising:
a first poly-phase AC electric motor including a star-connected first poly-phase winding as a stator winding;
a second poly-phase AC electric motor including a star-connected second poly-phase winding as a stator winding;
first and second inverters respectively connected to said first and second poly-phase windings;
inverter control means for controlling said first and second inverters;
AC command voltage generating means for generating an AC command voltage for generating an AC voltage across a first neutral point of said first poly-phase winding and a second neutral point of said second poly-phase winding; and
voltage detecting means for detecting a voltage across said first and second neutral points; wherein
said AC command voltage generating means includes a repetitive control unit calculating, based on a deviation in an immediately preceding AC voltage cycle between a reference voltage indicating a target of said AC voltage and the voltage detected by said voltage detecting means a first amount of compensation successively for each phase of said AC voltage; and
said inverter control means controls said first and second inverters based on a command voltage obtained by superposing said AC command voltage and said first amount of compensation on a command voltage of each phase for said first or second poly-phase AC electric motor.

8. The AC voltage output apparatus according to claim 7, further comprising
current detecting means for detecting a current flowing to a load receiving supply of said AC voltage; wherein
said AC command voltage generating means further includes a load current compensating unit calculating a second amount of compensation based on the current detected by said current detecting means; and
said inverter control means controls said first and second inverters based on a command voltage obtained by superposing said AC command voltage and said first and second amounts of compensation on the command voltage of each phase for said first or second poly-phase AC electric motor.

9. A hybrid vehicle, comprising:
the AC voltage output apparatus according to claim 1;
an internal combustion engine having a crank shaft mechanically coupled to a rotation shaft of said first poly-phase AC electric motor, and capable of applying rotational force to said first poly-phase AC electric motor; and
a driving wheel coupled to a rotation shaft of said second poly-phase AC electric motor, and receiving driving force from said second poly-phase AC electric motor.

10. An AC voltage output apparatus, comprising:
a first poly-phase AC electric motor including a star-connected first poly-phase winding as a stator winding;
a second poly-phase AC electric motor including a star-connected second poly-phase winding as a stator winding;
first and second inverters respectively connected to said first and second poly-phase windings; and
a controller executing a series of operations; wherein
said controller generates an AC command voltage for generating an AC voltage across a first neutral point of said first poly-phase winding and a second neutral point of said second poly-phase winding; distributes said AC command voltage to first and second AC command voltages based on a voltage burden ratio indicating ratio of voltage burdens to be borne by the first and second inverters for generating said AC voltage; controls said first inverter based on a command voltage obtained by superposing said first AC command voltage on a command voltage of each phase for said first poly-phase AC electric motor; and controls said second inverter based on a command voltage obtained by superposing said second AC command voltage on a command voltage of each phase for said second poly-phase AC electric motor.

11. The AC voltage output apparatus according to claim 10, wherein
said voltage burden ratio is set in accordance with driving load on said first and second poly-phase AC electric motors.

12. The AC voltage output apparatus according to claim 10, further comprising
a voltage sensor detecting a voltage across said first and second neutral points; wherein
said controller calculates an amount of compensation based on a deviation between a reference voltage indicating a target of said AC voltage and the voltage detected by said voltage sensor; and compensates for said reference voltage using the calculated amount of compensation to generate said AC command voltage.

13. An AC voltage output apparatus, comprising:
a first poly-phase AC electric motor including a star-connected first poly-phase winding as a stator winding;
a second poly-phase AC electric motor including a star-connected second poly-phase winding as a stator winding;
first and second inverters respectively connected to said first and second poly-phase windings;
a controller executing a series of operations; and
a voltage sensor detecting a voltage across said first and second neutral points; wherein
said controller calculates a first amount of compensation based on a deviation between an average value of magnitude of voltages detected by said voltage sensor and a reference value indicating a target of the average value; generates an AC command voltage for generating an AC voltage across a first neutral point of said first poly-phase winding and a second neutral point of said second poly-phase winding, based on said reference value compensated for by using the calculated first amount of compensation; controls said first inverter based on a command voltage of each phase for said first poly-phase AC electric motor; and controls said second inverter based on a command voltage obtained by superposing said AC command voltage on a command voltage of each phase for said second poly-phase AC electric motor.

14. The AC voltage output apparatus according to claim 13, wherein said controller calculates a second amount of compensation based on a deviation between a reference voltage indicating a target of said AC voltage and the voltage detected by said voltage sensor; and controls said first inverter based on a command voltage obtained by superposing said second amount of compensation on the command voltage of each phase for said first poly-phase AC electric motor.

15. An AC voltage output apparatus, comprising:

a first poly-phase AC electric motor including a star-connected first poly-phase winding as a stator winding;

a second poly-phase AC electric motor including a star-connected second poly-phase winding as a stator winding;

first and second inverters respectively connected to said first and second poly-phase windings;

a controller executing a series of operations; and a voltage sensor detecting a voltage across said first and second neutral points; wherein said controller generates an AC command voltage for generating an AC voltage across a first neutral point of said first poly-phase winding and a second neutral point of said second poly-phase winding; calculates, based on a deviation in an immediately preceding AC voltage cycle between a reference voltage indicating a target of said AC voltage and the voltage detected by said voltage sensor a first amount of compensation successively for each phase of said AC voltage; and controls said first and second inverters based on a command voltage obtained by superposing said AC command voltage and said first amount of compensation on a command voltage of each phase for said first or second poly-phase AC electric motor.

16. The AC voltage output apparatus according to claim 15, further, comprising a current sensor detecting a current flowing to a load receiving supply of said AC voltage; wherein said controller calculates a second amount of compensation based on the current detected by said current sensor; and controls said first and second inverters based on a command voltage obtained by superposing said AC command voltage and said first and second amounts of compensation on the command voltage of each phase for said first or second poly-phase AC electric motor.

* * * * *